Feb. 23, 1971 H. G. DIEBLER 3,566,283

SIGNAL CONVERTER

Filed Aug. 19, 1968 5 Sheets-Sheet 1

INVENTOR
HERMAN G. DIEBLER

ATTORNEY

INVENTOR
HERMAN G. DIEBLER

Raphael Semmes

ATTORNEY

Feb. 23, 1971 H. G. DIEBLER 3,566,283

SIGNAL CONVERTER

Filed Aug. 19, 1968 5 Sheets-Sheet 3

INVENTOR
HERMAN G. DIEBLER

Raphael Semmes

ATTORNEY

SIGNAL CONVERTER

Filed Aug. 19, 1968 5 Sheets-Sheet 4

INVENTOR
HERMAN G. DIEBLER

Raphael Semmes

ATTORNEY

INVENTOR
HERMAN G. DIEBLER

Raphael Semmes

ATTORNEY

United States Patent Office 3,566,283

Patented Feb. 23, 1971

3,566,283
SIGNAL CONVERTER

Herman G. Diebler, North Haledon, N.J., assignor to NUS Corporation, Washington, D.C., a corporation of the District of Columbia Filed Aug. 19, 1968, Ser. No. 753,642
Int. Cl. H03b *19/00;* H03k *5/00, 17/00*
U.S. Cl. 328—150 15 Claims

ABSTRACT OF THE DISCLOSURE

A voltage applied to one input terminal of a differential amplifier is converted to a frequency signal. A voltage threshold circuit monitors the difference voltage output of the differential amplifier and triggers a pulse generating circuit after a predetermined voltage threshold value is exceeded. The pulse generating circuit produces a pulse of constant width and amplitude which is applied to an averaging network, which, in turn, is connected to the other input terminal of the differential amplifier. The pulse generating circuit includes a constant voltage source and an electronic switch connecting the source to a pulse output terminal. A timer, which includes a crystal controlled pulse oscillator and a counter, causes the switch to open a predetermined time interval after it is closed. In order to insure that the width of the pulses provided are equal, the threshold circuit may take the form of a threshold AND gate which provides an output signal when the voltage threshold is exceeded and a pulse is received from the crystal controlled oscillator for enabling the counter to count and for closing the switch. Resistances may be provided in the switch circuit for compensating for signal nonlinearity. The converter is adaptable and may be employed as a voltage-to-frequency converter, a voltage reciprocal-to-frequency converter, a voltage ratio-to-frequency converter, a frequency-to-frequency converter, and a resistance-to-frequency converter.

BACKGROUND OF THE INVENTION

This invention relates to signal converter systems and more particularly to systems in which a voltage is converted to a frequency signal.

It is frequently desirable to convert a signal voltage, such as the voltage output of a transducer, into a signal whose frequency is a function of the voltage. The frequency signal may then be transmitted, as in a telemetering system, or employed to provide a digital read-out in a digital measuring system.

Prior art voltage-to-frequency converters typically employ a voltage controlled oscillator, the frequency of which varies with the voltage of the signal to be converted. In systems of this character, it is difficult to maintain a linear relationship between the input voltage signal and the frequency output. Moreover, such systems are difficult to stabilize and tend to be inaccurate.

It has also been suggested in the prior art that a voltage-to-frequency converter take the form of a system in which a capacitor is directly charged by the signal voltage to be converted until it reaches a value which triggers a pulse forming circuit from which feedback pulses are provided for partially discharging the capacitor. Circuits of this type tend to be temperature dependent and unstable and are also subject to inaccuracies.

SUMMARY OF THE INVENTION

It is accordingly the principal object of the present invention to provide an improved signal converter system.

More specifically, it is an object of the present invention to provide an accurate signal converter circuit which provides an output frequency which is a linear function of an input variable.

It is a further object of the invention to provide a signal converter system which is relatively free of instabilities and which tends to be relatively insensitive to temperature variation.

It is another object of the invention to provide a signal converter system with an offset voltage without introducing instability to the system.

An additional object of the invention is the provision of a voltage-to-frequency converter in which a pulse generating circuit is triggered whenever the difference in voltage between an input voltage signal and a direct current representing the average repetition rate of the pulse generator exceeds a predetermined threshold value. Related objects involve the provision of a pulse generating circuit which will provide a pulse of constant width and amplitude in response to the difference voltage exceeding the predetermined threshold value and the provision of a voltage threshold detector which will provide a trigger signal in response to the occurrence of a difference voltage exceeding the threshold value and a clock pulse from a constant frequency pulse oscillator forming a portion of the pulse generating circuit.

It is also an object of the invention to provide in a system of this character compensation for nonlinearities in a signal responsive to a condition.

Briefly, the invention contemplates the employment of a differential amplifier for comparing the magnitude of an input voltage and a voltage representing the average pulse repetition rate of a pulse generating network. When the difference voltage exceeds a predetermined threshold level, the pulse generating network is triggered to provide a pulse of constant width and amplitude to a pulse averaging network. The pulse generating network includes a constant frequency pulse source and a counter for establishing a predetermined time interval. An electronic switch is connected between a constant voltage source and the averaging network. Whenever the difference voltage exceeds the threshold level and a pulse is provided by the pulse generator, the switch is closed and the counter is enabled to count pulses from the pulse source. When a predetermined count is obtained, the switch is opened and the counter is inhibited from counting.

It is sometimes desirable to provide a zero offset so that a zero volt input signal will provide a frequency which is offset from zero. It is therefore contemplated by the invention that an offset voltage be provided to the input signal of the differential amplifier from a constant voltage source.

Since the input signal is sometimes a nonlinear function of a variable, it is contemplated that means be provided for correcting for this nonlinearity. This is accomplished by providing unequal resistance means in circuit with the electronic switch.

In addition, the voltage-to-frequency converter of the invention is adaptable for other uses. For example, the circuit may be employed as a reciprocal voltage-to-frequency converter, a voltage ratio-to-frequency converter, a frequency-to-frequency converter for converting a high frequency to a low frequency, and a resistance-to-frequency converter.

The foregoing and other objects, advantages, and features of the invention and the manner in which the same are accomplished will become more readily apparent upon consideration of the following detailed description of the invention when taken in conjunction with the accompanying drawings, which illustrate preferred and exemplary embodiments.

DESCRIPTION OF THE PREFERRED EMBODIMENTS

Figure 1:
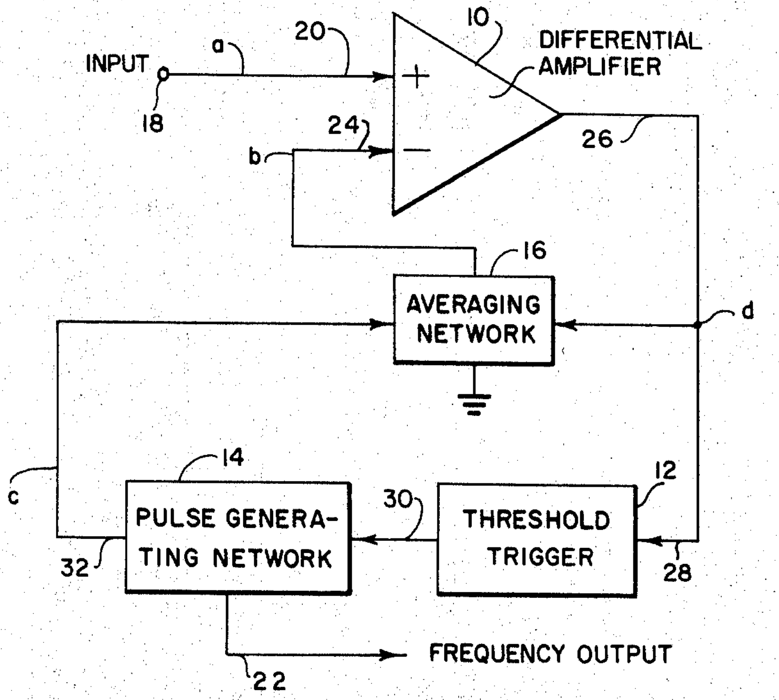
FIG. 1 is a schematic circuit diagram showing a signal converter system of the invention.

Turning to FIG. 1, it will be seen that a signal converter system of the invention basically comprises a differential amplifier 10, a threshold trigger circuit 12, a pulse generating network 14, and an averaging network 16. A voltage input signal is applied from an input terminal 18 to a first input terminal 20 of the differential amplifier 10, and the output frequency is taken on terminal 22 from pulse generating network 14. The output from the averaging network 16 is applied to a second input terminal 24 of the differential amplifier.

It is to be understood that the differential amplifier should be a very high gain amplifier, with the minimum acceptable gain depending upon the required accuracy of the voltage to frequency conversion. The input impedance effectively shunts the output of the averaging network, and changes in the value of the input impedance with time and temperature may affect the stability of the system. Since it is difficult to readily obtain an amplifier whose input impedance is independent of these variables, an amplifier with a very high input impedance is used, such as an amplifier having a field effect transistor input stage. The high input impedance thus provided will have a negligible effect on the output of the averaging network, and thus a change in this impedance will also have a negligible effect on the averaging network.

The differential amplifier provides a difference voltage on output terminal 26 which represents the difference between the voltages on input terminals 20 and 24. This difference voltage is applied to an input terminal 28 of a voltage threshold trigger circuit 12 which will provide a trigger pulse on an input lead 30 of pulse generating network 14 whenever the difference voltage output of differential amplifier 10 exceeds a predetermined voltage threshold level. Upon receipt of the trigger pulse from voltage threshold trigger circuit 12, the pulse generating network will generate a pulse of constant pulse width and constant pulse amplitude starting at ground and going positive. This pulse is fed via lead 32 to the averaging network 16, the output from which is a direct current voltage directly proportional to the repetition rate at which the pulse generating network produces its output pulses. The pulse also appears on output terminal 22 (which may be coincident with lead 32). Thus, whenever the difference voltage output of the differential amplifier exceeds the voltage threshold level of the threshold trigger circuit, a single pulse is generated by the pulse generating network 14.

Figure 2:
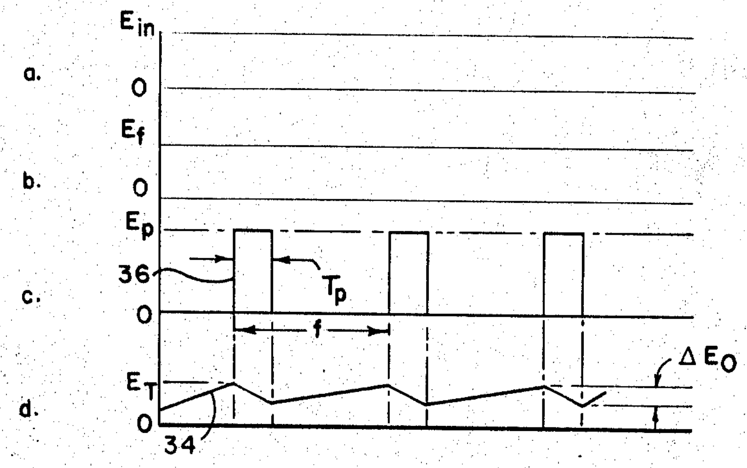
FIG. 2 is a diagram illustrating the operation of the circuit of FIG. 1.

The operation of the basic voltage-to-frequency conversion system just described can more readily be understood by reference to the waveforms given in FIG. 2 where the waveforms *a*, *b*, *c*, and *d* represent the waveforms at points *a*, *b*, *c*, and *d* in FIG. 1. Rather than considering the transient situation when a step voltage is applied at input terminal 20 of differential amplifier 10, let it be assumed that a voltage has been applied to this input terminal and that the system is in balance with a discrete output frequency having been achieved corresponding to this input voltage. This input voltage is shown in FIG. 2 as a direct current voltage having the value $E_{in}$. In this balanced situation, the difference voltage output of the differential amplifier, which is indicated by the curve 34 (waveform *d*), will not exceed the threshold voltage $E_T$ of the threshold trigger circuit 12. As a result, since differential amplifier 10 has a very high gain, the magnitude of the output voltage $E_f$ of averaging network 16 will, as shown by waveform *b* in FIG. 2, substantially equal the applied input voltage $E_{in}$. In actuality, $E_f$ will differ slightly from $E_{in}$ only by the input voltage to differential amplifier 10 which is required to produce the threshold voltage $E_T$ at the output of the amplifier. That is, $$E_f = E_{in} + \frac{E_T}{A}$$

where A is the open loop gain of differential amplifier 10. As can be seen from this expression, if A is very large, the error term $E_T/A$ can be ignored; therefore, $E_{in}$ may be considered as equal to $E_f$. Since, as illustrated by waveform *c*, every pulse 36 from pulse generating network 14 will have a fixed amplitude $E_p$ and a fixed period $T_p$, $E_f$ will be directly proportional to the repetition rate *f* of the output pulses from pulse generating network 14. This may be stated mathematically as $$E_f = T_p E_p f$$

Since, as already explained, $E_{in}$ may be considered as equal to $E_f$, $E_{in}$ may be defined by the following equation:

$$E_{in} = (T_p E_p) f$$

Hence, the input voltage is directly proportional to the output frequency with a proportionality constant equal to the area of the pulse 36 generated by the pulse generating network 14.

As previously mentioned, when the difference voltage output of amplifier 10 exceeds the predetermined voltage threshold level $E_T$ of threshold trigger circuit 12, pulse generating network 14 will be triggered. The resulting pulse is fed to averaging network 16 which provides the direct current voltage $E_f$ proportional to the average pulse rate of the pulses received from pulse generating network 14. It is, however, of some importance that direct current voltage $E_f$ include a slight amount of ripple (not shown in FIG. 2) which may be provided by properly selecting the components of averaging network 16 (to be described more fully hereinafter). This ripple causes the difference voltage output of differential amplifier 10 to reduce below the voltage threshold level $E_T$ when a pulse is received from pulse generating network 14. The threshold trigger is then disabled until the ripple causes the difference voltage output to exceed the threshold voltage level again at which time another pulse will be generated and the cycle will be repeated. This is illustrated by waveform *d* in FIG. 2 where the swings in the value of the difference voltage are shown by curve 34. If the output of differential amplifier 10 is not reduced to a level below the threshold voltage level $E_T$ by the time of the termination of the pulse, pulses would continuously be developed for the time that the threshold voltage was exceeded. In order to have a true voltage-to-frequency conversion, it is necessary to have a single pulse generated every time the threshold voltage is exceeded and to have the time lapsed between the generated pulses be proportional to the input voltage. The amplitude change $\Delta E_o$ at the output of differential amplifier 10 as the result of the feedback pulse of width $T_p$ and amplitude $E_p$ is unimportant as long as the output is reduced below the threshold voltage of the threshold trigger circuit 12 at the termination of the feedback pulse. The amplitude change $\Delta E_o$ should also not be so great that a nonlinear load is placed on the output of the amplifier by exceeding the input requirements of threshold trigger circuit 12.

Figure 3:
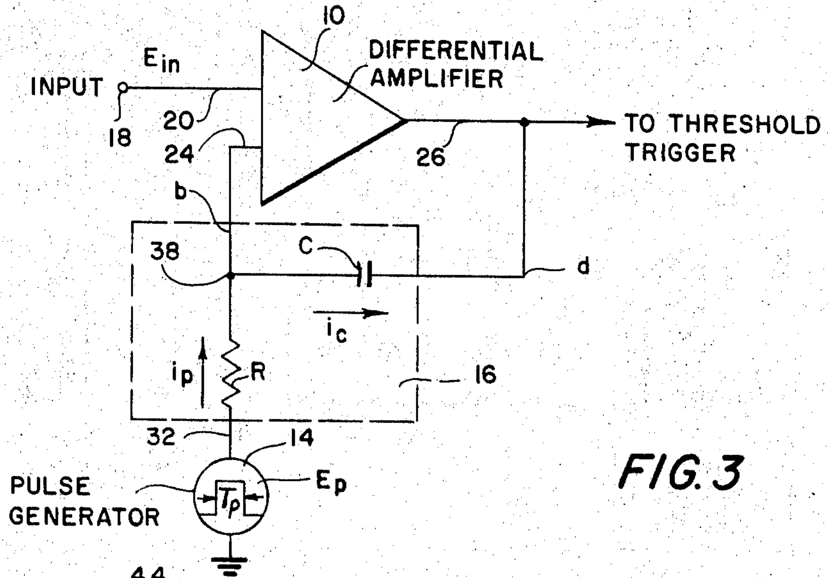
FIG. 3 is a partial schematic diagram of a signal converter system of the invention, showing the signal averaging network in greater detail.

Referring to FIG. 3, it will be seen that averaging network 16 may take the form of a resistor R and an averaging capacitor C, resistor R being connected between the output terminal 32 of pulse generator 14 and input terminal 24 of differential amplifier 10 and capacitor C being connected between output terminal 26 of differential amplifier 10 and input terminal 24 thereof. During the interval $T_p$ of the feedback pulse, a current $i_p$ will flow through resistor R and a current $i_c$ will flow through capacitor C. Since differential amplifier 10 has high gain, during this transient situation the junction point 38 between resistor R and capacitor C will be at an alternating current virtual ground such that $i_p=i_c$. On a direct current basis, the voltage at point 38 will be very near in value to the input voltage $E_{in}$. Just considering the alternating current case, $$i_p=\frac{E_p}{R}$$

and $$i_c=C\frac{\Delta E_o}{T_p}$$

Since $$i_p=i_c$$

$$RC=\frac{E_pT_p}{\Delta E_o}$$

This time constant RC is so related to the width $T_p$ and the amplitude $E_p$ of the pulse that the difference voltage drops below the threshold level prior to termination of the pulse.

In a particular practical circuit application, $\Delta E_o$ was chosen to be approximately 300 millivolts, $T_p$ was chosen to be 146 microseconds, and $E_p$ was chosen to be 3.4 volts. The resulting RC time constant was 1.67 milliseconds. This was implemented by choosing the nearest available component values of R (100,000 ohms) and of C (0.015 microfarad). It is to be understood that other values of R and C could have been chosen as long as their product was approximately 1.67 milliseconds. It should be borne in mind, however, that there are practical considerations in choosing the value of resistor R. The value of this resistor directly determines the current $i_c$ that must be supplied by the amplifier and also the current $i_p$ that must be supplied by pulse generator 14. Therefore, the low limit of resistor R is determined by the characteristics of these two circuits. The maximum size of resistor R is limited by the input impedance of differential amplifier 10 or, more exactly, by the change of input of impedance with temperature, since, on a direct current basis, resistor R and the input impedance will produce a divider action at the input of the amplifier limiting the temperature performance of the circuit.

The advantage of this approach, using a differential amplifier with a high input impedance, is that only negligible average current is required from the pulse generating network 14. Since the output impedance of the pulse generating network inevitably is composed of the dynamic resistance of transistors or diodes, which are temperature sensitive, an average current flow from the pulse generator through these resistances results in a voltage drop which, in turn, is temperature dependent. This error will directly effect the temperature stability of the voltage magnitude $E_p$ of the pulses produced by pulse generating network 14.

The linearity and temperature stability of the voltage-to-frequency conversion depends, to a large extent, upon the amplifier and the pulse generating network. The linearity of the conversion is dependent upon the gain of the amplifier due to the input error term. As previously indicated, if the gain of the amplifier is made very large, this error contribution is minimized. The effect of the amplifier on the temperature coefficient of conversion is dependent upon the change of its input impedance with temperature and upon its offset voltage temperature coefficient. The effect of input impedance change, as previously discussed, is minimized by using a field effect transistor input stage for the differential amplifier 10, such a transistor stage inherently having a very high input impedance. The effect of the offset voltage change with temperature is minimized by selecting an amplifier with a suitably matched input stage.

As will be evident from the expression $E_{in}=T_pE_pf$, the voltage-to-frequency conversion is directly dependent on the constancy of the pulse width $T_p$ and the pulse amplitude $E_p$ of the pulses produced by pulse generating network 14. Therefore, great care must be taken to keep $T_p$ and $E_p$ independent of the repetition rate and temperature. The manner in which this is accomplished will be evident from the circuit diagram of FIG. 4, which shows the pulse generating network in detail. The pulse width $T_p$ is established by means of timer means including a constant frequency crystal controlled pulse oscillator 40 which produces a chain of clock pulses 42 of much higher frequency than the pulse repetition frequency of the pulse generating network 14 as a whole. In order to maintain a constant pulse width, it is of some importance that the pulses generated by network 14 start in coincidence with an oscillator pulse and terminate N oscillator pulses later. To this end, the threshold trigger circuit may take the form of a threshold AND gate 44, one input lead 46 of which is connected to receive the difference output signal from differential amplifier 10 and the other input lead 48 of which is connected to receive pulses from crystal controlled oscillator 40. The threshold AND gate 44 is designed to provide an output trigger signal on output lead 50 whenever the difference voltage signal on input lead 46 is above the threshold level of the gate and an oscillator pulse occurs and is applied to input lead 48. In one practical embodiment of the circuit, a Texas Instruments Type SN7440N Positive Nand Buffer is employed as the threshold AND gate. Since this logic unit requires a minimum of two volts on its input leads to serve as logic "1" signals, it will be evident that the voltage threshold level of the gate is two volts and that the amplitude of the clock pulses from pulse source 40 must also be at least two volts. The trigger signal serves to set a control flip-flop circuit 52, being applied to a set input terminal 54 thereof. This will serve to remove a logic "1" output signal on reset output lead 56 of flip-flop circuit 52 which normally inhibits counting of a N-stage counter 58 by application to a series of reset input terminals 60 for each of the stages of the counter. It is to be understood that counter 58 is of the type known in the prior art in which a logic "1" input to the reset inputs of each of the flip-flop stages thereof will take precedence over any other signal so that with the reset signal applied, the circuit is prevented from counting any input pulse. With counter 58 thus reset, the output at terminal 62 of the counter will be in its low level or logic "0" state, and the output at terminal 64 will be in its logic "1" state which, by virtue of a connection to control flip-flop input reset input lead 66, serves to maintain control flip-flop 52 in its reset state. However, when a trigger signal at the output of threshold AND gate 44 sets control flip-flop circuit 52, the inhibiting signal applied to reset inputs 60 of counter 58 will be removed, allowing the counter to count clock pulses from the crystal controlled oscillator 40 applied to counter input terminal 68. The first clock pulse received causes output 62 of the counter to go to its logic "1" state and output 64 to go to its logic "0" state. A logic "1" state signal at lead 62 causes actuation of an electronic switch 70 by application to a control input terminal 72 thereof. Although electronic switch 70 is shown symbolically as a relay, it is to be understood that it may take the form of any conventional solid state or vacuum tube switching circuit providing the switching functions shown.

It is to be observed that electronic switch 70 is the equivalent of a relay having a first fixed contact 74, a second grounded fixed contact 76, and a movable contact 78. In its normal, or unactuated condition, electronic switch 70 will provide a switch path to a point of ground potential 80 from pulse output terminal 82 through movable contact 78 and fixed contact 76. With the switch in this condition, a discharge path is provided for capacitor C of averaging network 16. When electronic switch 70 is actuated upon receipt of the logic "1" signal at terminal 72, movable contact 78 is effectively moved to engagement with fixed contact 74, thus completing a circuit from a voltage divider 83 to pulse output terminal 82. The voltage divider comprises a first resistor 84 and a second resistor 86 connected across a constant voltage Zener reference voltage source 88 and providing a voltage output terminal 90 at an intermedaite tapping point thereof. Voltage divider 83 provides a voltage equal to the pulse voltage amplitude $E_p$ at terminal 90, which voltage is derived from the voltage $E_z$ of the constant voltage Zener reference source 88. The potential divider ratio $K_1$ is so chosen that $E_p=K_1E_z$. Upon actuation of switch 70, voltage $E_p$ is applied to averaging network 16, causing the voltage difference output of the amplifier to reduce below the voltage threshold level of threshold AND gate 44 removing the trigger signal from output lead 50 and set terminal 54 of flip-flop 52.

When the N-stage counter 58 counts N clock pulses, the output of electronic switch 70 will return to its grounded state with the application of a logic "0" signal on input terminal 72 from output terminal 62 of counter 58. At this time, the output 64 of counter 58 will return to its logic "1" state, thus resetting control flip-flop circuit 52, and inhibiting the N-stage counter 58 from counting. The control flip-flop circuit will again be set and the cycle will begin over again when a trigger signal output is again received from the threshold AND gate 44. As mentioned earlier, this trigger output will occur when the difference output voltage of the differential amplifier 10 exceeds the threshold voltage level of the gate and is coincident with a clock pulse.

The operation just described produces a pulse when the output of differential amplifier 10 is above a fixed threshold voltage level upon the occurrence of a clock pulse. The width of the pulse is determined by the frequency of crystal controlled oscillator 40 and the number of stages N of the counter, and the constancy of the width is determined by the inherent stability of the crystal oscillator and the N-stage counter. The pulse amplitude $E_p$ is also stable, since it is a direct function of a stable constant voltage Zener diode reference source.

It is to be borne in mind that this approach for establishing the width of the pulse requires that the frequency $f_R$ of the clock or oscillator be much larger than the resulting output frequency of the voltage-to-frequency converter in order to reduce the jitter that would be observed by a frequency counter. This jitter is a result of the fact that the pulse position is not fixed in time at all output frequencies, since the time of pulse occurrence is a function of the clock frequency.

Figure 4:
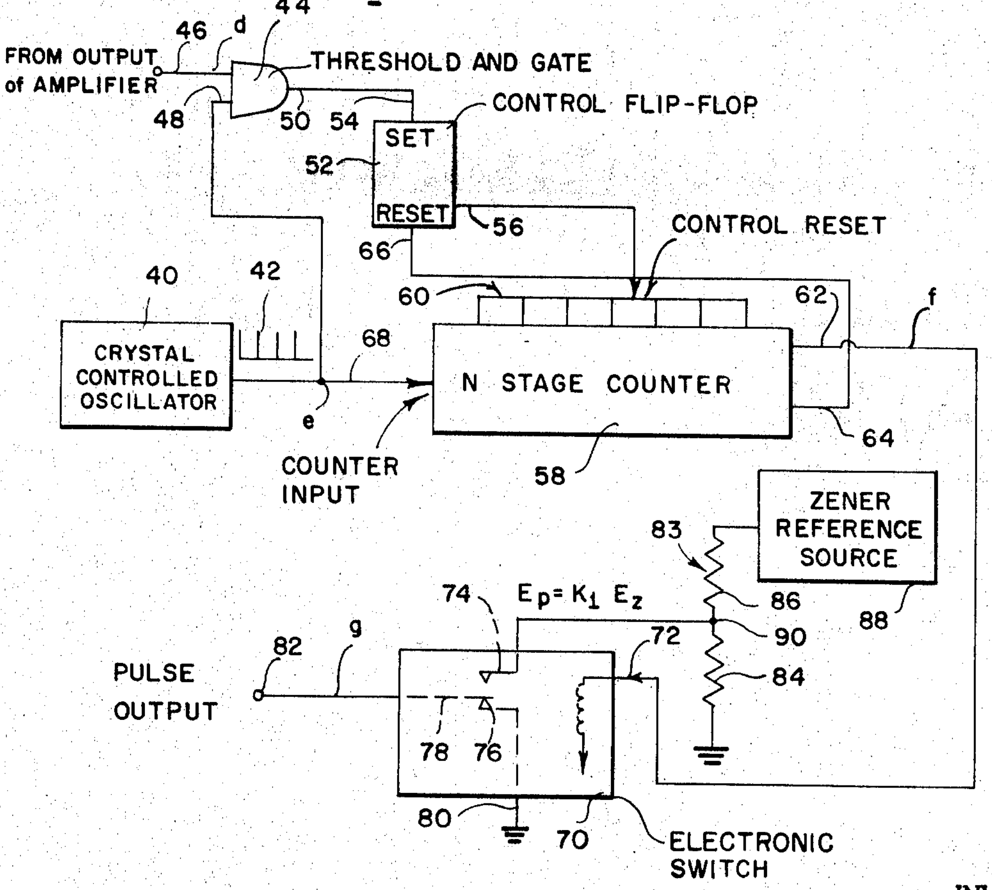
FIG. 4 is a partial schematic diagram of the invention showing the threshold trigger circuit and pulse generating network in greater detail.
Figure 5:
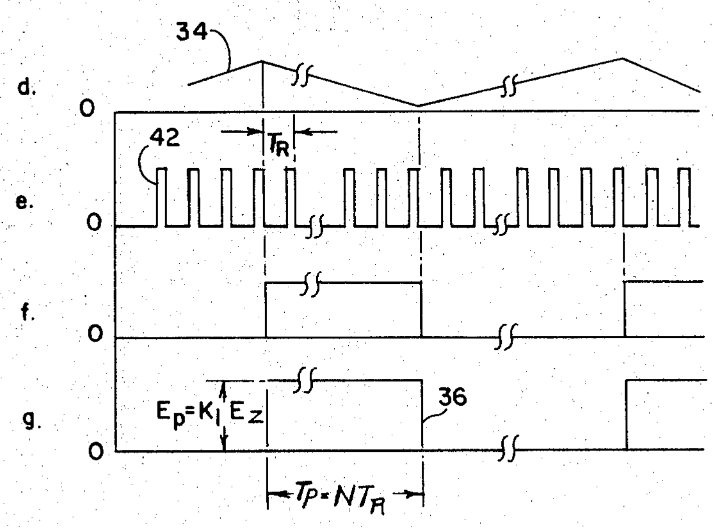
FIG. 5 is a diagram illustrating the operation of the invention.

Turning to FIG. 5, where waveforms *d*, *e*, *f*, and *g* represent the waveforms at point *d*, *e*, *f*, and *g* in the circuit of FIG. 4, it will be seen that the clock pulses 42 have a period $T_R$ and that the pulses 36 have a period $T_p=NT_R$. The equation for the voltage-to-frequency conversion as stated earlier, is:

$$E_{in}=(T_pE_p)f$$

It can now be written as:

$$E_{in}=(NT_RK_1E_z)f$$

This equation suggests some interesting possible applications, greatly enhancing the adaptability of the system for many purposes in addition to voltage-to-frequency conversion. For example, solving the above equation for $E_z$, $$E_z=\frac{(E_{in})}{(NT_RK_1)}\frac{1}{f}$$

If $E_{in}$ is made constant, and $E_z$ is made the input voltage, then the output frequency would be proportional to the reciprocal to the input voltage. The signal converter would then be a reciprocal voltage-to-frequency converter.

If, on the other hand, both $E_{in}$ and $E_z$ are made input voltage signals, the output frequency would be proportional to the ratio of these voltages, since $$\frac{E_{in}}{E_z}=(NT_RK_1)f$$

The converter system would then be a voltage ratio-to-frequency converter.

Also, if the equation is solved for the clock frequency $$f_R=\frac{1}{T_R}$$

then $$f_R=\frac{(NK_1E_z)f}{(E_{in})}$$

If $E_{in}$ and $E_z$ are held constant, the output frequency becomes proportional to the higher clock frequency. The converter system is then a frequency converter shifting the higher clock frequency of the oscillator to a lower frequency.

In many applications, it is necessary to provide an output frequency other than zero when the input voltage $E_{in}$ is equal to zero volts. To this end, an internal offset voltage $E_{of}$ is required. For example, when the output of a transducer varies from zero to some full scale voltage and the output frequency if required to be in a given IRIG band, an offset voltage is sufficient magnitude to shift the output frequency at zero input volts to a frequency within the band as required. If it be supposed that the transducer being monitored has an output voltage ranging from 0 volts to 3 volts and that it is desired that the output frequency for this voltage range vary from 888 Hz. to 2473 Hz. (covering IRIG bands 4, 5, 6 and 7), it is necessary to provide an offset voltage at the input of the converter system which would produce an internal input voltage at zero output voltage of the transducer.

It is of some importance that the offset voltage be provided from a stable voltage source, because the stability of the offset directly effects the stability of the voltage-to-frequency conversion of the transducer output. If the offset voltage changes with temperature, it would be impossible to distinguish the output frequency change resulting from the change in the offset voltage from a change in frequency resulting from a change in the input signal. While a stable offset voltage could be provided from an additional constant voltage Zener reference source, it is advantageous to use the same Zener reference source 88 which is used to establish the pulse amplitude. The manner in which this may be accomplished is illustrated in the circuit diagram of FIG. 6. As before, the Zener reference source. The offset voltage $E_{of}$ is taken from the junction divider 83 including resistors 84 and 86 is connected across the Zener reference source. The potential divider 83 provides the pulse amplitude voltage $E_p$ which is equal to $E_zK_1$ where $K_1$ is the divider ratio of potential divider 83. A second potential divider 92 is also connected across Zener reference souce 88 and includes a resistor 94 and a resistor 96 connected in series across the Zener reference source. The offset voltage $E_{of}$ is taken from the junction point 98 and will be equal to $K_2E_z$ where $K_2$ is the divider ratio of potential divider 92. This offset voltage is coupled through a coupling resistor 100 to input terminal 20 of differential amplifier 10. In order to isolate the offset voltage from the input voltage terminal 18 an additional coupling resistor 102 is provided between terminal 18 and input terminal 20 of the differential amplifier.

Figure 6:
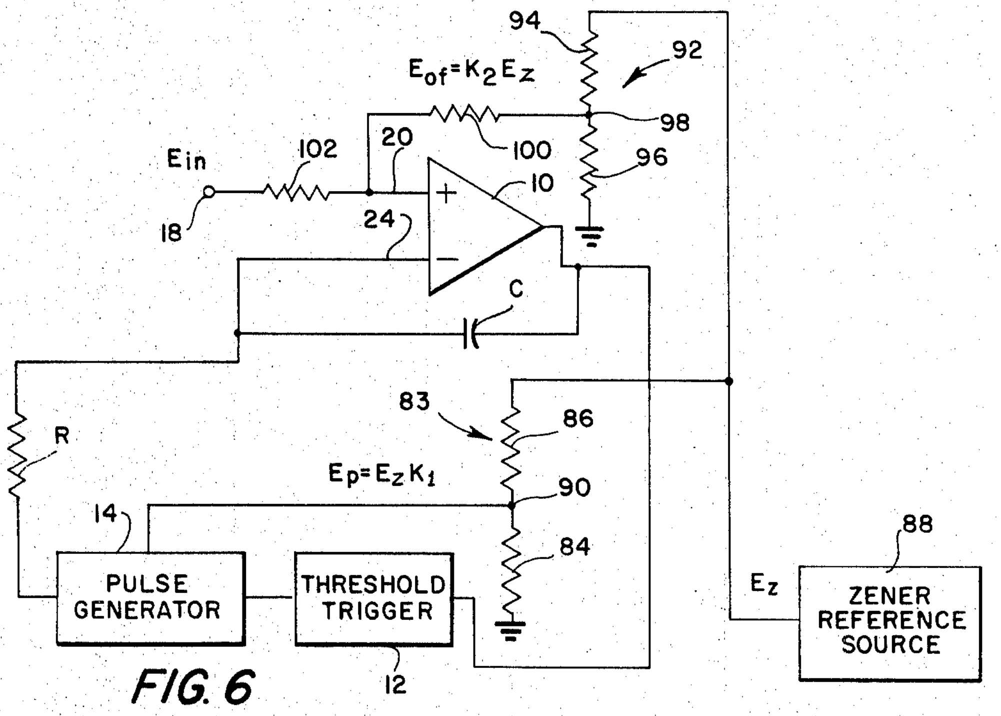
FIG. 6 is a circuit diagram showing another embodiment of the invention.

The input voltage $E_{in}$ in the circuit of FIG. 6 may be defined by the following equation:

$$E_{in}=(T_pK_1E_z)f-E_{of}$$

or $$E_{in}=(T_pK_1E_z)f-K_2E_z$$

It can be seen from the above equation that at zero volts input, the output frequency is independent of any voltage source, since the term $E_z$ will cancel out. The output frequency for zero volts input would then be a function only of the divider ratios $K_1$ and $K_2$ and the pulse duration. From this is can be concluded that the output frequency with any input voltage is independent of any variation in the offset voltage as the result of a change of the voltage source. Of course, if the Zener reference voltage were to change with an input voltage applied to the voltage-to-frequency converter system, the output frequency would change as the result of a change in $E_p$, but this change would not be compounded by a change in the offset voltage as well.

Figure 7:
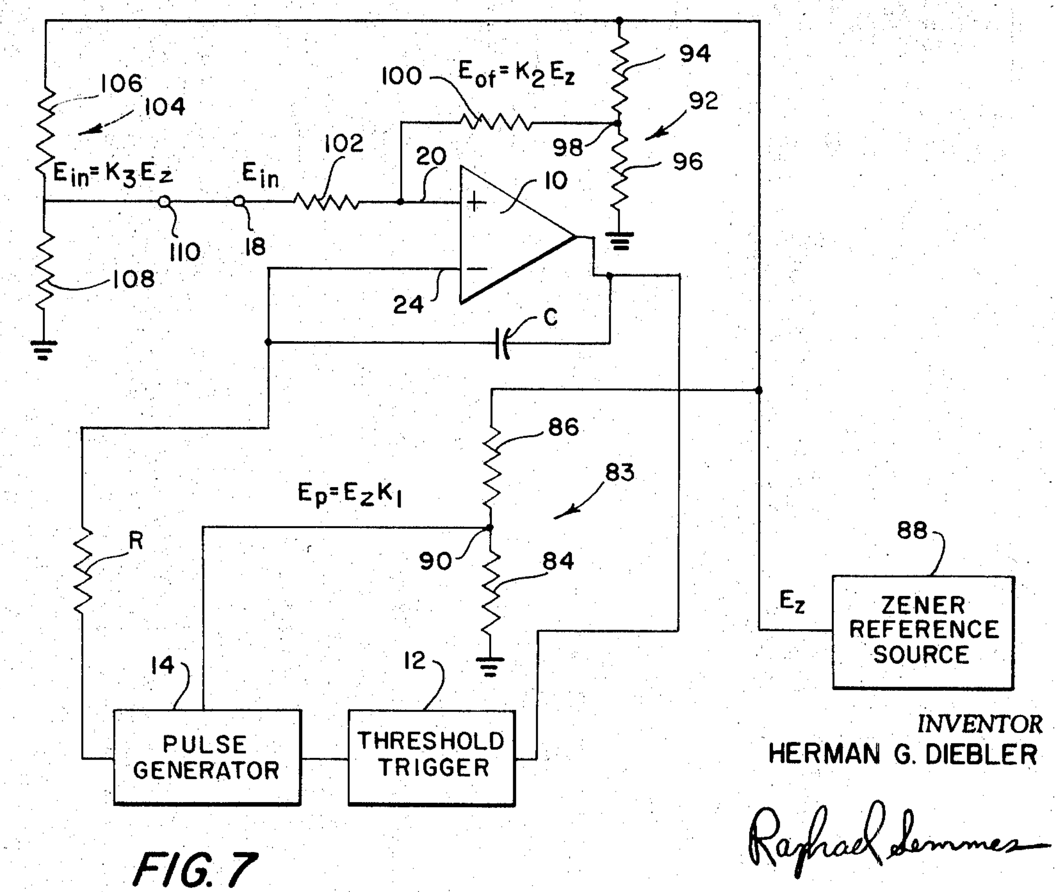
FIG. 7 is a circuit diagram showing an additional embodiment of the invention.

Turning to FIG. 7, it will be seen that this concept may be extended to provide a resistance-to-frequency converter by making the input voltage $E_{in}$ also a function of the constant voltage $E_z$ from Zener reference source 88. A third potential divider 104 is connected across Zener reference source 88 and includes a resistor 106 in series with a resistor 108 providing a potential divider ratio $K_3$ at a terminal 110 connected to the junction point. This terminal is connected to input terminal 18 to provide the input voltage $E_{in}$ which will be equal to $K_3E_z$. One of the resistors 106 or 108 may be variable as a function of a condition to vary $K_3$. For example, one of these resistors could be a platinum resistance temperature probe so that its resistance value will vary with temperature, and the divider ratio $K_3$ will also vary directly with temperature. Since the input voltage $E_{in}$ will then be a function of temperature, it will be seen that the output frequency from the signal converter system taken from pulse generator 14 will be a function of resistance and also a function of temperature. Mathematically speaking, $$K_3E_z=T_pK_1E_zf-K_2E_z$$

or $$K_3=T_pK_1f-K_2$$

Hence it can be seen that the output frequency $f$ is independent of any voltage source, only being dependent on the resistor ratios $K_1$, $K_2$, and $K_3$ of the potential dividers and the pulse width $T_p$. Therefore, if $K_3$ is directly proportional to temperature, then the output frequency will be directly proportional to temperature.

Figure 8:
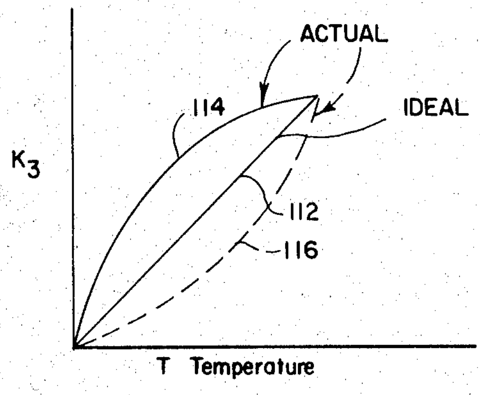
FIG. 8 is a diagram useful in explaining one feature of the invention.
Figure 9:
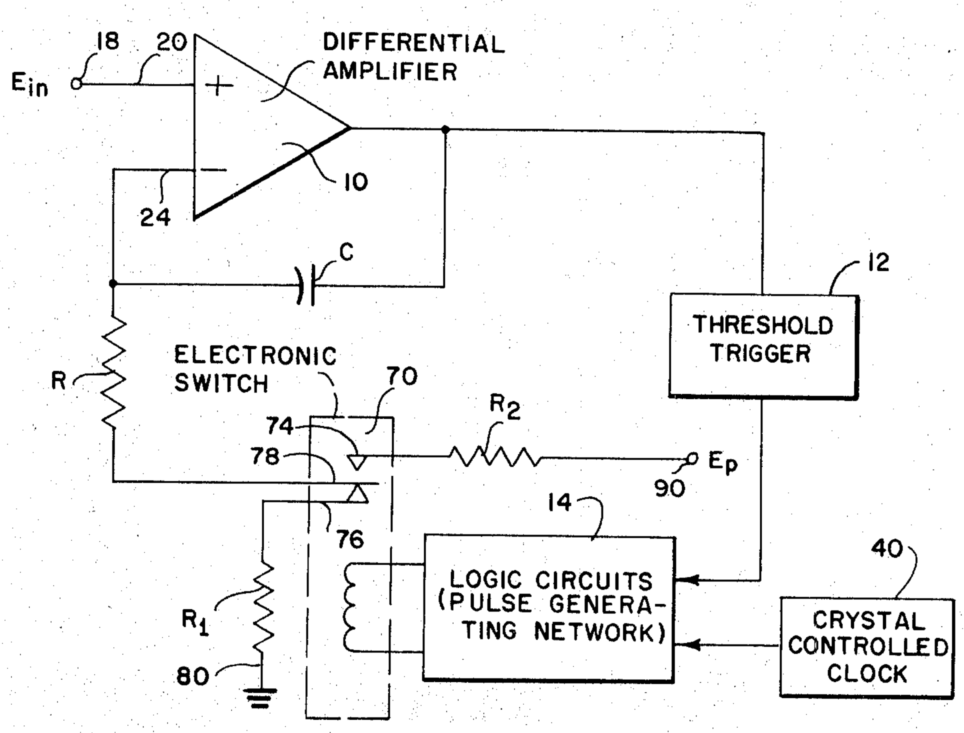
FIG. 9 is a circuit diagram showing another embodiment of the invention.
Figure 10:
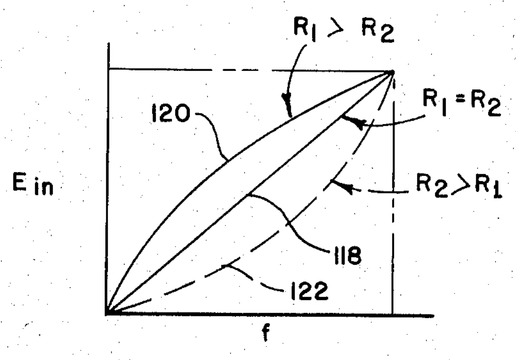
FIG. 10 is a diagram illustrating the operation of the embodiment of FIG. 9.

In many instances, however, it is difficult to obtain a linear relationship between $K_3$ and another variable such as temperature. This is illustrated by the curves of FIG. 8. It is desirable that $K_3$ behave like the "ideal" curve 112 where $K_3$ is directly proportional to temperature T. However, it is more likely, in a practical situation, that it would behave nonlinearly and have a characteristic resembling one of the "actual" curves 114 or 116. The "actual" curves appear to be approximations of a square law behavior, and it has been found that this type of nonlinearity can be corrected for in the voltage-to-frequency converter system so that a linear conversion of temperature to frequency can be realized. As shown in FIG. 9, this correction can be achieved by making the voltage-to-frequency conversion nonlinear to the extent of the $K_3$ nonlinearity but in the opposite direction in order to provide a cancelling effect. As shown in FIG. 9, this may be accomplished by the addition of a resistance $R_1$ between the virtual fixed terminal 76 of electronic switch 70 and the point of ground potential 80 and a resistance $R_2$ between the virtual fixed contact 74 and the terminal 90 of potential divider 83 providing the pulse amplitude voltage $E_p$. The effect of resistance $R_1$ and $R_2$ is illustrated by the curves of FIG. 10. If $R_1$ is made equal to $R_2$, the linear curve 118 results and no compensation is provided. If, however, $R_1$ is greater than $R_2$, the output frequency will follow curve 120. On the other hand, if $R_2$ is made greater than $R_1$, the output frequency will be governed by the dash line curve 122. In both cases, the resulting nonlinearity approximates a square law behavior. These nonlinearities as shown in curves 120 and 122 may be explained as due to the fact that capacitor C is charged through resistance $R_2$ and discharged through resistance $R_1$ with unequal time constants. Thus, it is possible to select the values $R_1$ and $R_2$ so as to introduce a nonlinearity of the type shown in FIG. 10 which will compensate for the nonlinearity in the potential divider ratio $K_3$ as a function of temperature as illustrated in FIG. 8.

While preferred embodiments of the invention have been shown and described, it will be apparent to those skilled in the art that changes can be made without departing from the principles and spirit of the invention, the scope of which is defined in the appended claims.

The invention claimed is:

1. A signal converter system comprising:
   differential circuit means having first and second input terminals and a difference output terminal and providing a difference voltage at said difference output terminal equal to the difference between a first voltage applied to said first input terminal and a second voltage applied to said second input terminal;
   voltage threshold circuit means coupled to said difference output terminal and providing a trigger signal when said difference voltage exceeds a predetermined threshold value;
   pulse generating means coupled to said voltage threshold circuit means to receive said trigger signal and produce a pulse in response thereto, said pulse generating means comprising a voltage source, switch means for coupling said source to a pulse output terminal, and timer means responsive to said voltage threshold circuit means for closing said switch means for a predetermined time interval after said voltage threshold value is exceeded, whereby a pulse of constant width is provided, said timer means comprising a constant frequency pulse source, a counter coupled to receive pulses from said pulse source, and means for opening said switch in response to a predetermined count in said counter; and
   averaging network means for providing a voltage proportional to the pulse repetition rate of said pulse generating means and having an input lead coupled to said pulse generating means to receive pulses therefrom and an output lead coupled to said second input terminal of said differential circuit means.

2. A signal converter system as recited in claim 1, wherein said voltage threshold means comprises means for preventing actuation of said switch means until the occurrence of said voltage threshold value and one of said pulses from said pulse source.

3. A signal converter system as recited in claim 1, wherein said voltage threshold means comprises an AND gate, one input of said AND gate being coupled to said difference output terminal and another input of said AND gate being coupled to said pulse source, whereby an output signal will be developed by said AND gate when the difference voltage exceeds said threshold voltage value and a pulse is produced by said pulse source.

4. A signal converter system as recited in claim 3, wherein said pulse generating means comprises bistable control circuit means, means establishing a first state in said control circuit means in response to said output signal developed by said AND gate for enabling said counter for counting, and means establishing a second state in said control circuit means in response to said predetermined count for inhibiting said counter from counting.

5. A signal converter system as recited in claim 4, wherein said control circuit means comprises a flip-flop, said means for establishing a first state comprises a set input terminal of said flip-flop coupled to receive the output signal from said AND gate, and said means for establishing a second state comprises a reset input terminal of said flip-flop coupled to receive a signal from said counter signifying said predetermined count.

6. A signal converter system providing an output frequency proportional to the reciprocal of an input voltage comprising:

differential circuit means having first and second input terminals and a difference output terminal and providing a difference voltage at said difference output terminal equal to the difference between a first constant voltage applied to said first input terminal and a second voltage applied to said second input terminal;

voltage threshold circuit means coupled to said difference output terminal and providing a trigger signal when said difference voltage exceeds a predetermined threshold value;

pulse generating means coupled to said voltage threshold circuit means to receive said trigger signal and produce a pulse in response thereto, said pulse generating means comprising an input voltage terminal for receiving said input voltage, switch means for coupling said input voltage terminal to a pulse output terminal, and timer means responsive to said voltage threshold circuit means for closing said switch means for a predetermined time interval after said voltage threshold value is exceeded, said output frequency being the frequency of said pulse generating means; and averaging network means for providing a voltage proportional to the pulse repetition rate of said pulse generating means and having an input lead coupled to said pulse generating means to receive pulses therefrom and an output lead coupled to said second input terminal of said differential circuit means.

7. A signal converter system providing an output frequency proportional to the ratio of a first input voltage signal and a second input voltage signal comprising:

differential circuit means having first and second input terminals and a difference output terminal and providing a difference voltage at said difference output terminal equal to the difference between said first input voltage signal comprising a first voltage applied to said first input terminal and a second voltage applied to said second input terminal;

voltage threshold circuit means coupled to said difference output terminal and providing a trigger signal when said difference voltage exceeds a predetermined threshold value;

pulse generating means coupled to said voltage threshold circuit means to receive said trigger signal and produce a pulse in response thereto, said pulse generating means comprising an input voltage terminal for receiving said second input voltage signal, switch means for coupling said input voltage terminal to a pulse output terminal, and timer means responsive to said voltage threshold circuit means for closing said switch means for a predetermined time interval after said voltage threshold value is exceeded, said output frequency being the frequency of said pulse generating means; and averaging network means for providing a voltage proportional to the pulse repetition rate of said pulse generating means and having an input lead coupled to said pulse generating means to receive pulses therefrom and an output lead coupled to said second input terminal of said differential circuit means.

8. A signal converter system for converting an input frequency to a lower output frequency comprising:

differential circuit means having first and second input terminals and a difference output terminal and providing a difference voltage at said difference output terminal equal to the difference between a first voltage applied to said first input terminal and a second voltage applied to said second input terminal;

voltage threshold circuit means coupled to said difference output terminal and providing a trigger signal when said difference voltage exceeds a predetermined threshold value;

pulse generating means coupled to said voltage threshold circuit means to receive said trigger signal and produce a pulse in response thereto, said pulse generating means comprising a voltage source, switch means for coupling said source to a pulse output terminal, and timer means responsive to said voltage threshold circuit means for closing said switch means for a predetermined time interval after said voltage threshold value is exceeded, said timer means comprising a pulse source, a counter coupled to receive pulses from said pulse source, and means for opening said switch means in response to a predetermined count in said counter, said input frequency being the frequency of said pulse source and said output frequency being taken from said pulse output terminal; and averaging network means for providing a voltage proportional to the pulse repetition rate of said pulse generating means and having an input lead coupled to said pulse generating means to receive pulses therefrom and an output lead coupled to said second input terminal of said differential circuit means.

9. A resistance-to-frequency signal converter system comprising:

differential circuit means having first and second input terminals and a difference output terminal and providing a difference voltage at said difference output terminal equal to the difference between a first voltage applied to said first input terminal and a second voltage applied to said second input terminal;

voltage threshold circuit means coupled to said difference output terminal and providing a trigger signal when said difference voltage exceeds a predetermined threshold value;

a voltage source, a first and a second resistor connected in series across said voltage source, one of said resistors being variable to vary the potential divider ratio of said resistors, and means coupling the junction between said resistors to said first input terminal;

means to apply an offset voltage to said first input terminal, comprising a potential divider connected across said voltage source;

pulse generating means coupled to said voltage threshold circuit means to receive said trigger signal and produce a pulse in response thereto, said pulse generating means comprising an additional potential divider connected across said voltage source, switch means for coupling a point on said potential divider to a pulse output terminal, and timer means responsive to said voltage threshold circuit means for closing said switch means for a predetermined time interval after said voltage threshold value is exceeded; and averaging network means for providing a voltage proportional to the pulse repetition rate of said pulse generating means and having an input lead coupled to said pulse generating means to receive pulses therefrom and an output lead coupled to said second input terminal of said differential circuit means.

10. A signal converter system comprising:

differential circuit means having first and second input terminals and a difference output terminal and providing a difference voltage at said difference output terminal equal to the difference between a first voltage applied to said first input terminal and a second voltage applied to said second input terminal;

voltage threshold circuit means coupled to said difference output terminal and providing a trigger signal when said difference voltage exceeds a predetermined threshold value;

means to apply an offset voltage to said first input terminal, comprising a potential divider connected across a constant voltage source;

pulse generating means coupled to said voltage threshold circuit means to receive said trigger signal and produce a pulse in response thereto, said pulse generating means comprising an additional potential divider connected across said constant voltage source, switch means for coupling a point on said potential divider to a pulse output terminal, and timer means responsive to said voltage threshold circuit means for closing said switch means for a predetermined time interval after said voltage threshold value is exceeded; and averaging network means for providing a voltage proportional to the pulse repetition rate of said pulse generating means and having an input lead coupled to said pulse generating means to receive pulses therefrom and an output lead coupled to said second input terminal of said differential circuit means.

11. A signal converter system comprising:

differential circuit means having first and second input terminals and a difference output terminal and providing a difference voltage at said difference output terminal equal to the difference between a first voltage applied to said first input terminal, said first voltage varying nonlinearly in response to a condition, and a second voltage applied to said second input terminal;

voltage threshold circuit means coupled to said difference output terminal and providing a trigger signal when said difference voltage exceeds a predetermined threshold value;

pulse generating means coupled to said voltage threshold circuit means to receive said trigger signal and produce a pulse in response thereto, said pulse generating means comprising a voltage source, switch means for coupling said source to a pulse output terminal, timer means responsive to said voltage threshold circuit means for closing said switch means for a predetermined time interval after said voltage threshold value is exceeded, and means for compensating for said nonlinearity in said first voltage; and averaging network means for providing a voltage proportional to the pulse repetition rate of said pulse generating means and having an input lead coupled to said pulse generating means to receive pulses therefrom and an output lead coupled to said second input terminal of said differential circuit means.

12. A signal converter system as recited in claim 11, wherein said switch means, when closed, provides a path between said voltage source and said pulse output terminal and, when open, provides a path between said pulse output terminal and a point of ground potential and wherein said means for compensating for said nonlinearity comprises a first resistance connected between said voltage source and said switch means and a second resistance between said point of ground potential and said switch means, said resistances being unequal and of such value as to provide compensation for said nonlinearity.

13. A signal converter system as recited in claim 12, wherein said averaging network means comprises a capacitor coupled between said difference output terminal and said output lead and a resistor coupled between said input lead and said output lead, said capacitor charging through said first resistance and discharging through said second resistance with unequal time constants to provide said compensation.

14. In a signal converter system, means for providing a signal as a nonlinear function of a condition;

an averaging network including an averaging capacitor;

a voltage source;

switch means providing a first switch path from said source to said network and a second switch path from said averaging network to a point of ground potential;

pulse means responsive to said signal for closing said first switch path and opening said second switch path for a predetermined time interval;

and compensation means in said first and second switch paths for compensating for said nonlinearity of said signal.

15. In a signal converter system as recited in claim 14, said compensation means comprising a first resistance in said first switch path and a second resistance in said second switch path, said resistances being unequal and of such value as to provide said compensation.

References Cited

UNITED STATES PATENTS

| | | | |
|---|---|---|---|
| 3,040,273 | 6/1962 | Boff | 328—127X |
| 3,169,233 | 2/1965 | Schwartz | 307—235X |
| 3,188,484 | 6/1965 | Jorgensen | 328—63X |
| 3,264,541 | 8/1966 | Mell | 307—235X |
| 3,386,039 | 5/1968 | Naive | 328—127X |
| 3,389,271 | 6/1968 | Gray | 307—271X |

DONALD D. FORRER, Primary Examiner

J. ZAZWORSKY, Assistant Examiner

U.S. Cl. X.R.

307—235, 261, 271; 328—15, 59, 127